United States Patent
Parness et al.

(10) Patent No.: US 9,517,610 B2
(45) Date of Patent: Dec. 13, 2016

(54) GRIPPERS BASED ON OPPOSING VAN DER WAALS ADHESIVE PADS

(71) Applicants: CALIFORNIA INSTITUTE OF TECHNOLOGY, Pasadena, CA (US); THE BOARD OF TRUSTEES OF THE LELAND STANFORD JUNIOR UNIVERSITY, Stanford, CA (US)

(72) Inventors: Aaron Parness, Los Angeles, CA (US); Brett A. Kennedy, Pasadena, CA (US); Matthew C Heverly, Pasadena, CA (US); Mark R. Cutkosky, Palo Alto, CA (US); Elliot Wright Hawkes, Tallahassee, FL (US)

(73) Assignees: CALIFORNIA INSTITUTE OF TECHNOLOGY, Pasadena, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 393 days.

(21) Appl. No.: 14/177,973

(22) Filed: Feb. 11, 2014

(65) Prior Publication Data
US 2014/0227473 A1 Aug. 14, 2014

Related U.S. Application Data

(60) Provisional application No. 61/764,814, filed on Feb. 14, 2013, provisional application No. 61/913,540, filed on Dec. 9, 2013.

(51) Int. Cl.
*B32B 7/12* (2006.01)
*B25J 15/00* (2006.01)

(52) U.S. Cl.
CPC .............. *B32B 7/12* (2013.01); *B25J 15/008* (2013.01); *B25J 15/0052* (2013.01); *Y10T 428/21* (2015.01); *Y10T 428/24025* (2015.01)

(58) Field of Classification Search
CPC ........... H01L 21/68707; H01L 21/6831; Y10T 428/24802
See application file for complete search history.

(56) References Cited

U.S. PATENT DOCUMENTS

| | | | | |
|---|---|---|---|---|
| 7,430,792 | B2 * | 10/2008 | Linnemann | B23P 19/00 29/33 K |
| 7,456,526 | B2 * | 11/2008 | Teramachi | F16C 29/063 310/12.21 |
| 7,762,362 | B2 * | 7/2010 | Cutkosky | B62D 57/024 180/8.1 |
| 2006/0005362 | A1 * | 1/2006 | Arzt | B25J 15/00 24/442 |
| 2006/0078725 | A1 * | 4/2006 | Fearing | B81C 1/00111 428/323 |

(Continued)

*Primary Examiner* — Gerard Higgins
(74) *Attorney, Agent, or Firm* — Steinfl & Bruno, LLP

(57) ABSTRACT

Novel gripping structures based on van der Waals adhesive forces are disclosed. Pads covered with fibers can be activated in pairs by opposite forces, thereby enabling control of the adhesive force in an ON or OFF state. Pads can be used in groups, each comprising a group of opposite pads. The adhesive structures enable anchoring forces that can resist adverse forces from different directions. The adhesive structures can be used to enable the operation of robots on surfaces of space vehicles.

8 Claims, 12 Drawing Sheets

(56) References Cited

U.S. PATENT DOCUMENTS

2008/0025822 A1\* 1/2008 Kim ................. H01L 21/68707
  414/217.1
2008/0070002 A1\* 3/2008 Majidi ...................... C09J 9/00
  428/141

\* cited by examiner

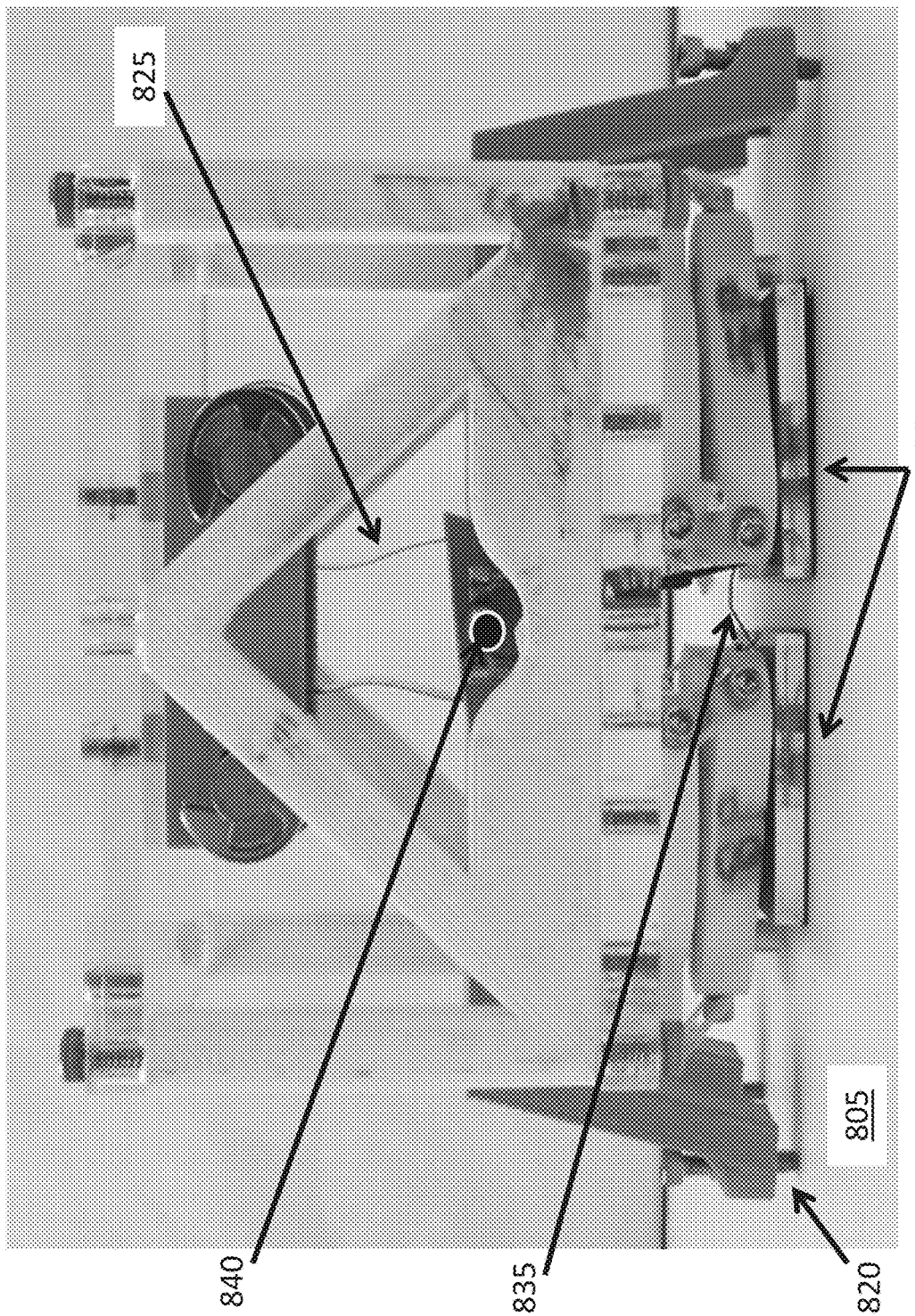

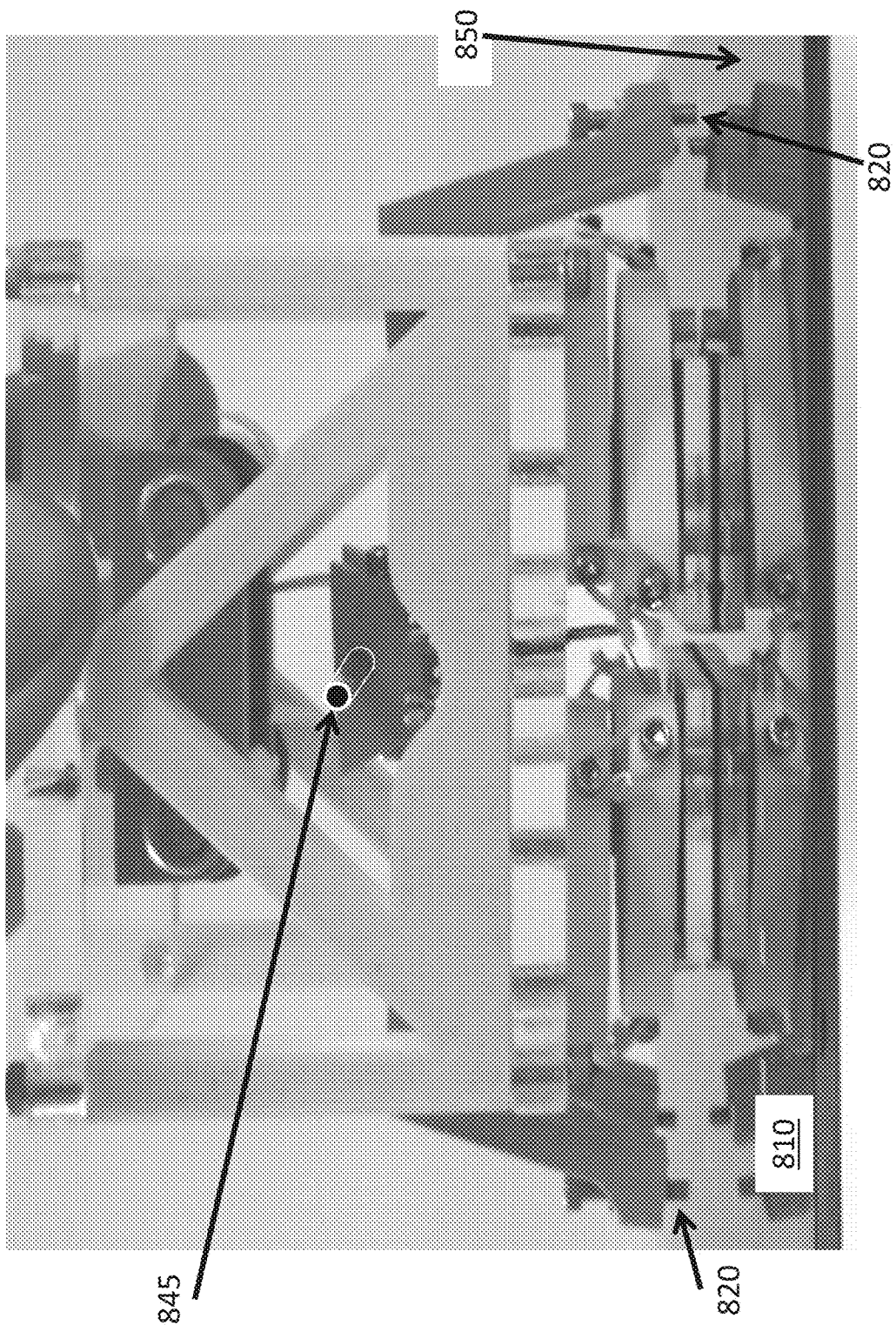

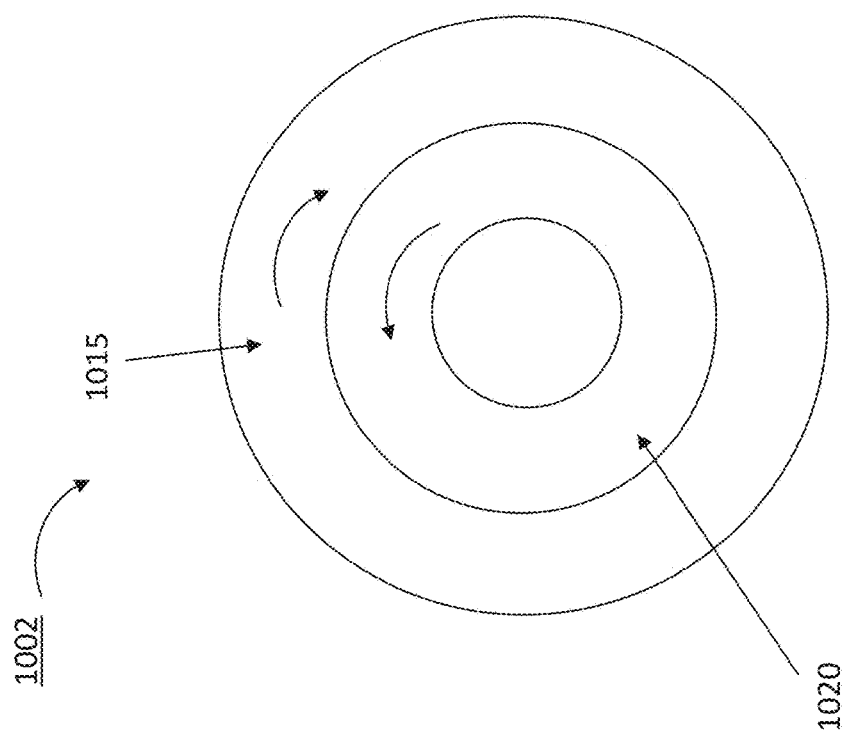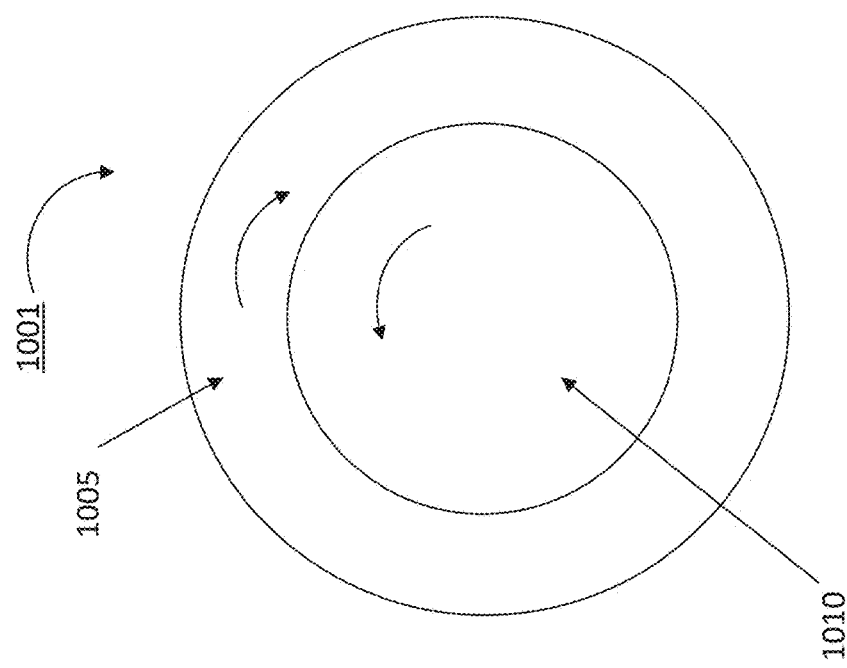
FIG. 10

GRIPPERS BASED ON OPPOSING VAN DER WAALS ADHESIVE PADS

CROSS REFERENCE TO RELATED APPLICATIONS

The present application claims priority to U.S. Provisional Patent Application Nos. 61/764,814, filed on Feb. 14, 2013, and 61/913,540, filed on Dec. 9, 2013, the disclosures of which are incorporated herein by reference in their entirety.

STATEMENT OF INTEREST

The invention described herein was made in the performance of work under a NASA contract, and is subject to the provisions of Public Law 96-517 (35 USC 202) in which the Contractor has elected to retain title.

TECHNICAL FIELD

The present disclosure relates to adhesive structures. More particularly, it relates to grippers based on opposing van der Waals adhesive pads.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIGS. 8A and 8B illustrate yet another embodiment of an adhesive structure, in both OFF (FIG. 8A) and ON (FIG. 8B) states.

FIG. 10 illustrates two exemplary pads for grippers which have a counter-rotating mechanism.

SUMMARY

Figure 1:
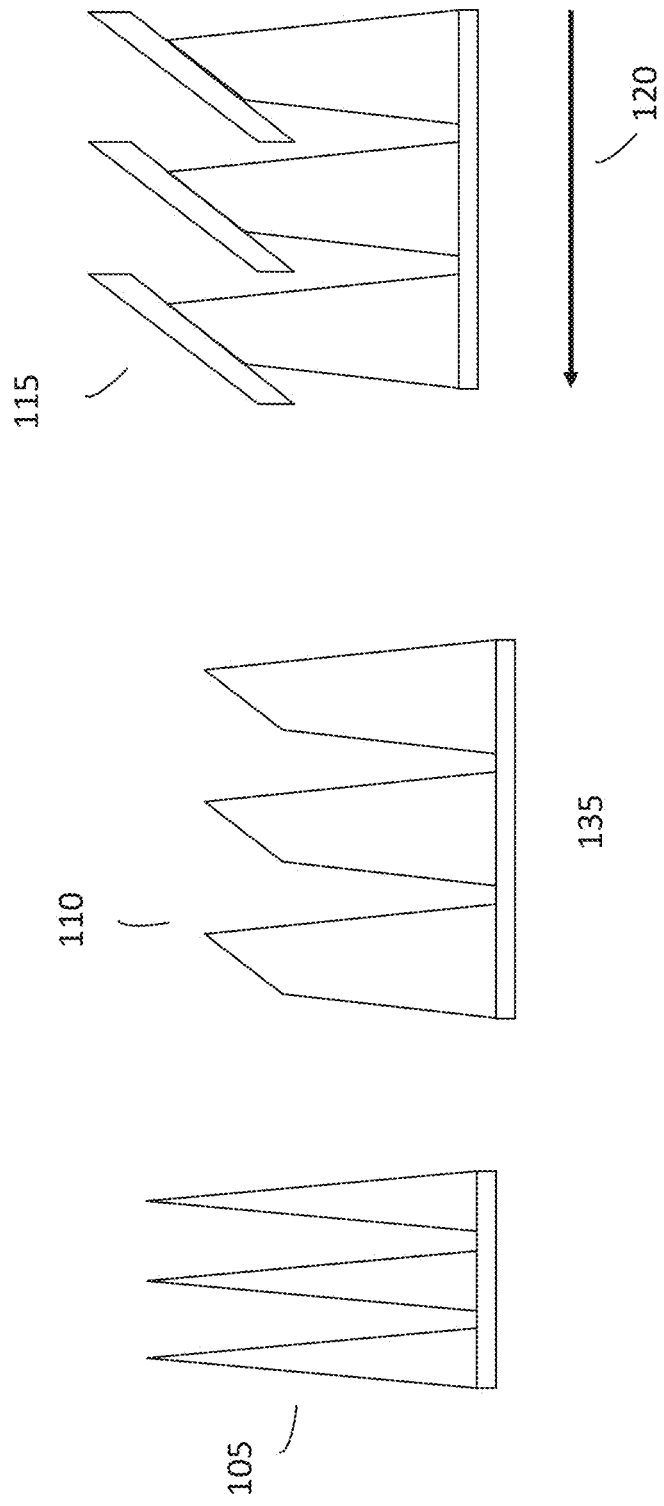
FIG. 1 illustrates possible exemplary geometries for the fibers of a gripping pad.

In a first aspect of the disclosure, a structure is described, the structure comprising: at least two pads, each having a first surface and a second surface, wherein the at least two pads are spaced apart the same distance from a center of symmetry of the structure; a plurality of fibers attached to the first surface of each pad, wherein the fibers substantially extend longitudinally in a direction away from the first surface; connecting elements, attached to the second surface of each pad, the connecting elements forming a mechanical supporting structure linking together the at least two pads; actuating elements, attached to the second surface of each pad, the actuating elements forming an actuating link between the at least two pads, wherein, during operation, the at least two pads are pulled in a tensing direction by the actuating elements, the tensing direction being towards or away from the center of symmetry, wherein a bending direction of the plurality of fibers of each pad is substantially opposite to the tensing direction, and wherein the plurality of fibers is configured to bend and compress against a surface external to the structure to enable adhesion through van der Waals forces.

DETAILED DESCRIPTION

The present disclosure describes structures which allow adhesion to surfaces through the van der Waals forces acting on pads covered with numerous fibers. Mechanical forces are applied between pads in order to enhance the operation of pads and overall adhesion of a structure, as well as allowing control of the adhesive force (ON/OFF activation of the adhesive force) In some embodiments, pads may operate in pairs, and a mechanical force may be applied to push apart the pair of pads, or to pull them together. In other embodiments, pads may operate not in pairs, but with a common center of symmetry for the mechanical forces applied to them. For example, three pads may be spaced at 120 degrees in a symmetrical pattern, with a mechanical force applied to each pad along the direction from the pad to the center of symmetry of the pattern. The mechanical force may allow control of the adhesion for the pads, for example enabling adhesion or detachment as desired. The mechanical force may be applied through several ways, for example through a spring or a wire under tension.

In some embodiments, a spring is held in an extended state, away from equilibrium, by a mechanical stop mechanism. When a pad is attached to a surface, a mechanical element may trigger and release the mechanical stop that is holding the spring extended away from equilibrium. As a consequence, the spring will expend the stored elastic potential energy, applying a mechanical force that pushes the pads towards each other in a direction parallel to the surface to which the pads are attached. Through this mechanical force the pads are held under tension in a direction going from each pad to the other pad (in a pair of pads), thereby enhancing the contact of the pads' fibers, to the surface to which the pads are attached. Without such force, the pads' fibers may have a decreased area of contact with the surface they adhere to.

In other embodiments, the direction of the mechanical force may be opposite to the embodiments above, where each pad is pulled away from the other of a corresponding pair. These embodiments may be useful, for example, to grip flexible surfaces such as sheets of materials (like a sheet of paper or plastic). One reason is that if the pads were pushed towards each other, the surface, being flexible, would likely crumple, with a possible loss of adhesion for both pads. By pushing the pads away from each other, the flexible surface is instead put under tension, avoiding any disruptive crumpling.

The fibers in a pad, as understood by a person skilled in the art, would normally be flexed in the same direction as the other fibers within each pad. The direction of the fibers in a pad is correlated to the direction of the mechanical force used to control the adhesion of the pads. For example, if the pads are pushed towards each other, the longitudinal axis of the fibers should point away from the opposite pad. In such a way, as the pads are pulled towards the other, the fibers bend and compress against the surface they are adhering too, enhancing the van der Waals forces. In other words, the direction toward which the fibers bend is opposite the direction that the pad is pushed or pulled in. The mechanical force applied to the pad may not involve any actual movement, but rather be a tension without a movement, as understood by the person skilled in the art.

In other embodiments, when the pads are pushed away from each other, the longitudinal axis of the fibers should bend and point towards the opposite pad. In such away, again the fibers are pushed and compressed towards the surface they are adhering too, as the tension applied to the pads keeps them pushed away from each other. The fibers therefore are compressed towards the surface they adhere to, in order to control the van der Waals forces.

The mechanical force applied to the pads allows an increase in and a higher degree of control over the adhesion of the pads. The adhesion is based on the van der Waals forces acting between fibers and a surface in a manner similar to geckos. Geckos have toes covered in microscopic fibers. Thousands of these fibers, each of them contributing a small amount of adhesion through van der Waals forces, together form a link strong enough to permit a gecko to climb a vertical wall or plant. Geckos stick and unstick their toes to a surface through a specific movement of each toe, such as by controlling the angle of the toe to the surface. Similarly, the adhesion of the pads of the structures of the present disclosure can be controlled by pushing or pulling the pads away from each other, or towards each others.

A similar mode of operation as that described above for opposing pads can also be applied, with little modifications, for the embodiments where the pads are not exactly opposite each others, but are rather organized in groups (such as groups of three pads), wherein all the pads in a group are pushed or pulled away or towards the center of symmetry of the group.

The structures described in the present disclosure may have a variety of applications, such as the fabrication of anchors which can adhere to surfaces in vacuum, for example on the international space station (ISS). Such anchors may be used to attach computers in place, or other tools, during activities in space, both inside a vehicle, or outside a vehicle. The structures described in the present disclosure may also be used, for example, to fabricate adhesively anchored mobile robots. For example, such robots may be dedicated to extra-vehicular spacecraft inspections in space, and contain a variety of instruments such as cameras, lasers and sensors. Such robots may, for example, be able to move along the outer surface of a space craft in space vacuum, and carry out maintenance, repairs, and structural integrity inspections.

The structures described in the present disclosure have the particular advantage of being able to control the adhesion as an ON or OFF state. As described in the present disclosure, gecko adhesive pads, or van der Waals pads, can be used in opposition to one another to create omnidirectional anchors. In other words, the anchors of the present disclosure can provide an anchoring force against a force applied to the anchor from different directions.

Multiple sets of opposed pads in combination (for example, four sets of counterbalanced pairs) can be used to control and scale the adhesive anchoring force depending on the surface area and application. The displacement and load of the pads, or grippers, can be balanced relative to one another in order to accommodate any misalignment.

A variety of mechanisms may be used to control the pads, for example cables, linear rails, ball-screws or other linear actuators, as well as spherical pivots.

In other embodiments, omni-directional grippers may be fabricated with counter-rotating rings of adhesive fibers. Counter-rotating rings may have one ring with adhesive pads pointing in a clockwise direction, and another ring with adhesive pads pointing in a counter-clockwise direction. A rotation or tension without rotation can be placed between the two rings so as to move them in opposite directions. This can be done, for example, with a spring, cable, motor, or other methods, as understood by the person skilled in the art. In other embodiments, more than two counter-rotating rings may be used together in unison or independently. For example, there may be two clockwise rings and two anti-clockwise, or one clockwise and two counterclockwise. The rings may have different widths.

In some embodiments, adhesive forces up to 75 kPa or more can be possible with the structures of the present disclosure.

The fibers in the grippers of the present disclosure are activated through a shear motion, as understood by the person skilled in the art. The fibers may have a variety of shapes, from simple, slender cone-like structures (similar to a real gecko lamellae), to more complicated shapes designed to increase the contact area between the fibers and the surface they are adhering to. Both the force normal to the surface and the shear force, parallel to the surface, may be used to control the adhesion of a gripper. The structures described in the present disclosure allow the control of the ratio of shear to normal forces, native tackiness, and other parameters, through control of the geometry and shape of the fibers.

In some embodiments, the fibers are fabricated through technique that will be known to the person skilled in the art, for example by photolithography using SU-8™ resist. The fibers may be fabricated with polymers using a mold. An exemplary set of dimensions for conical fibers may be a base of 20 micrometers and a height of 65 micrometers.

Because the fibers operate based on van der Waals forces, adhesion is operative in a wide range of physical conditions, such as temperature and pressure.

FIG. 1 illustrates possible exemplary geometries for the fibers of a gripping pad, such as conical (105), or trapezoidal (110), or other more complex shapes (115). As understood by the person skilled in the art, certain shapes such as (115) may allow a greater surface contact area between the fibers and a surface to which they adhere to. For the geometry (115), the preferred direction of an applied shear force is that shown by arrow (120). When the pads are pressed against a surface, the fibers of shape (115) will bend in the direction opposite to arrow (120).

In some embodiments, when the shear force is zero, the pads can be easily released. In some embodiments, the angle between the pads and the surface they adhere to can be controlled, in order to control the force of adhesion and obtain an ON/OFF behavior for adhesion.

An advantage of the structures described in the present disclosure is the ability, for an anchor or gripping apparatus comprising the gripping pads with fibers, to resist forces acting on the structures from multiple directions. In such a way, the structures can retain their adhesion without being involuntarily released. In other words, the anchors are omni-directional.

The structure herein described can also allow adhesion to curved or non-flat surfaces. The structures of the present disclosure oppose a preferred direction of multiple pads around a central housing. As understood by the person skilled in the art, the preferred direction of a pad is that direction which enables the greater force of adhesion thanks to the orientation of its fibers when compressed against a surface. In such a way, the anchors can resist any force applied along any vector away from the surface the anchor is adhering too. In some embodiments, compliance flexure joints can be used to relieve any moments applied to the anchor.

Figure 2A:
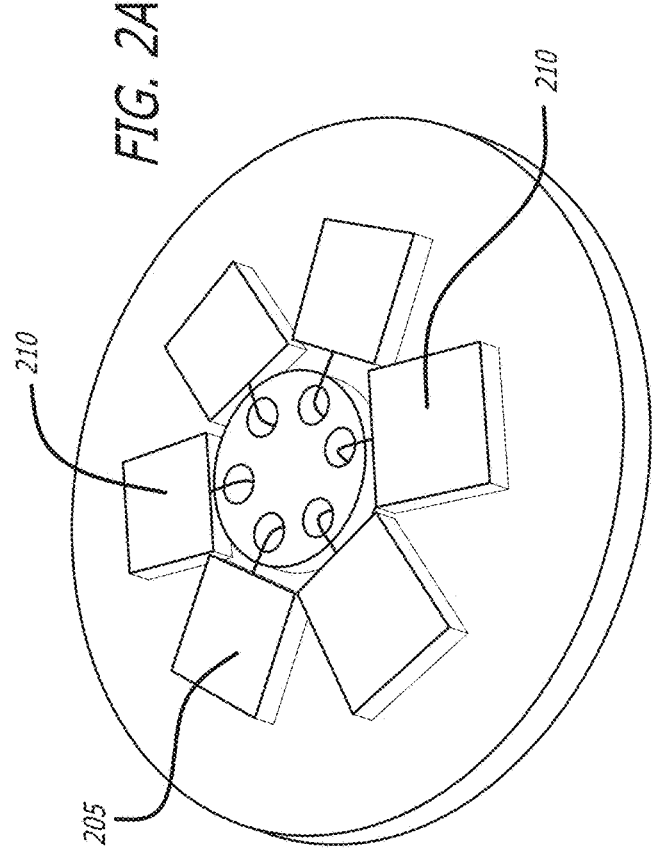
FIGS. 2A and 2B illustrate an exemplary device with six pads.
Figure 2B:
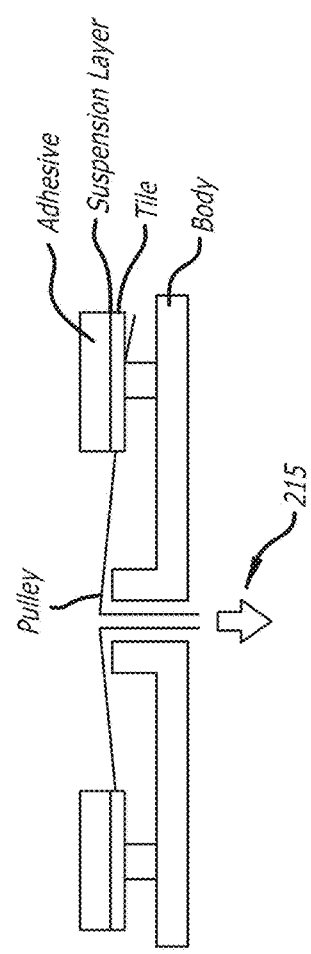

FIGS. 2A and 2B illustrate an exemplary device with six pads (205). The pads can operate in pairs, such as pair (210). A pulley (215) can pull the pads towards each other, enabling the application of a shear force.

Figure 3:
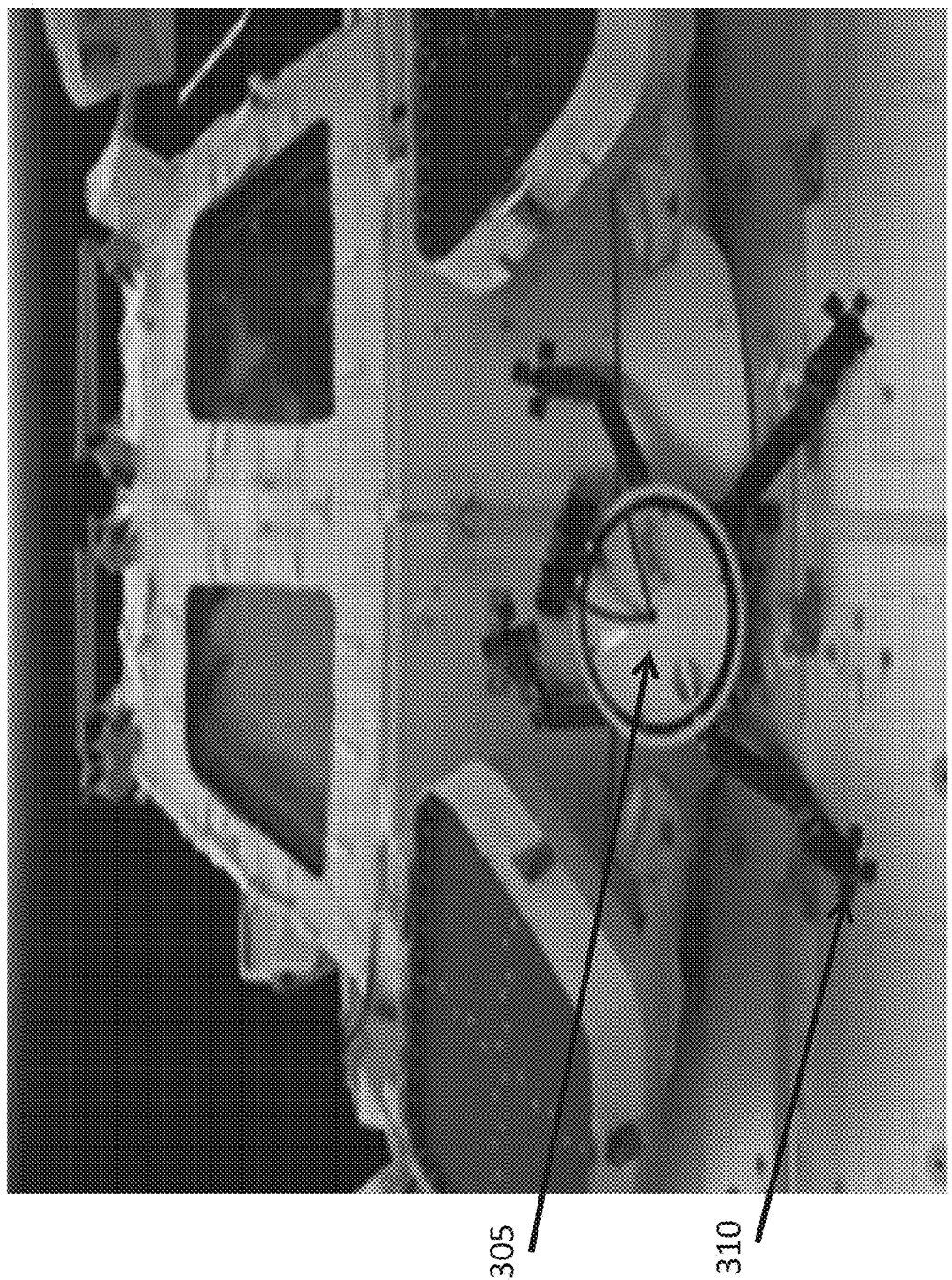
FIG. 3 illustrates an exemplary robot attached to a space vehicle through sets of grippers.

FIG. 3 illustrates an exemplary robot (305) attached to a space vehicle through sets of grippers (310). In some embodiments, a robot would have four limbs, each with a set of grippers, to allow a high degree of flexibility of movement, reliability and redundancy. A robot may also have limited thruster capability to reattach to a surface in case of loss of adhesion. A robot may have a battery source as well as power generation such as solar panels. The robot may carry a set of cameras such as HemiCam™. Macro and contextual cameras may be installed on the robot, allowing for still and video recording capabilities. A mid range infrared sensor may be present on the robot for structural inspection. Gas sensors may be installed on the robot for leak inspection of a vehicle atmosphere into space. Accelerometers, magnetometers and other sensors may be part of the robot instrumentation.

Figure 4:
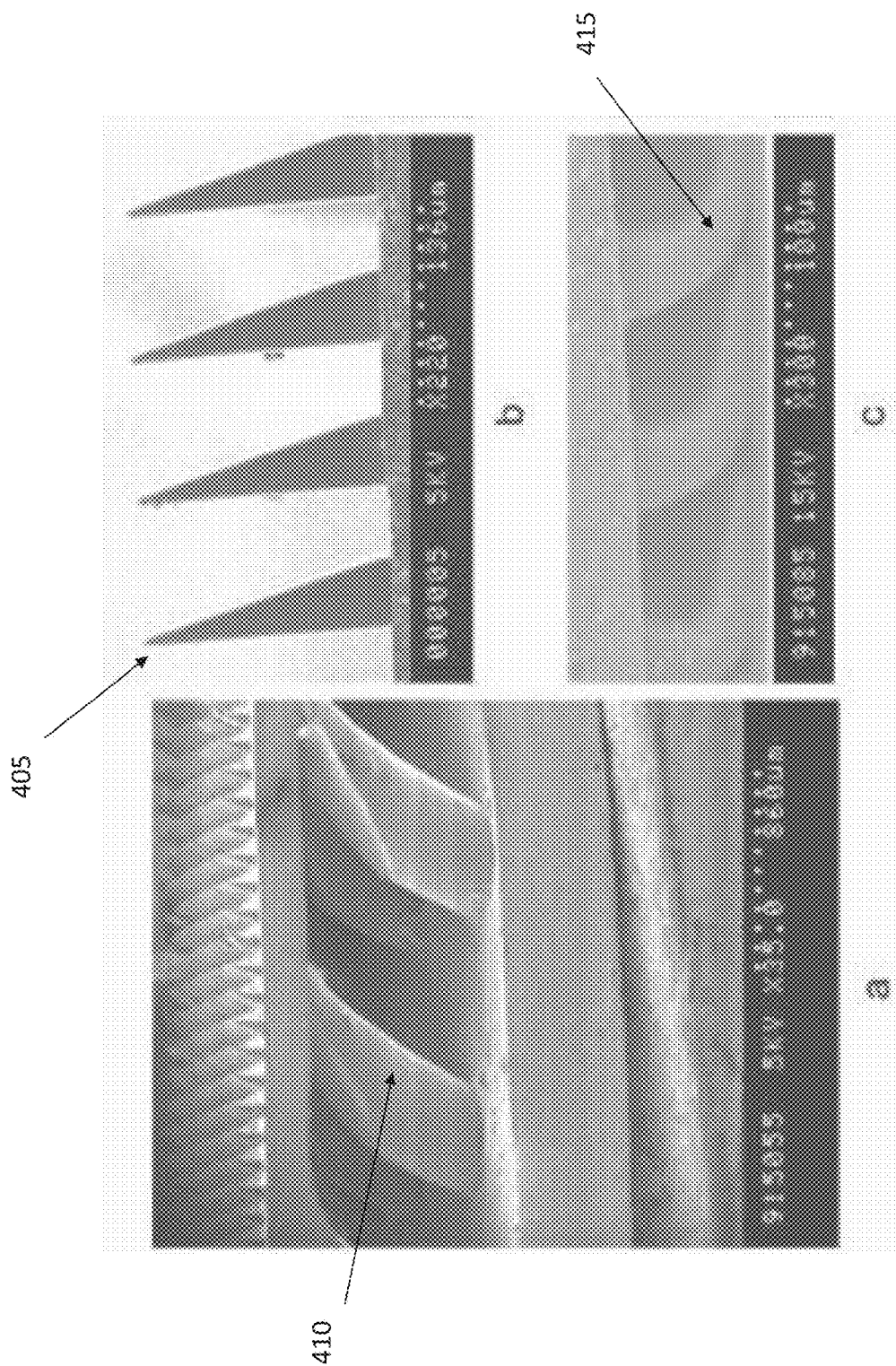
FIG. 4 illustrates scanning electron microscope pictures of exemplary fibers.

FIG. 4 illustrates scanning electron microscope pictures of exemplary fibers, such as conical fibers (405), or conical fibers with a lateral cut (410). Fibers (415) are compressed against a surface.

Figure 5:
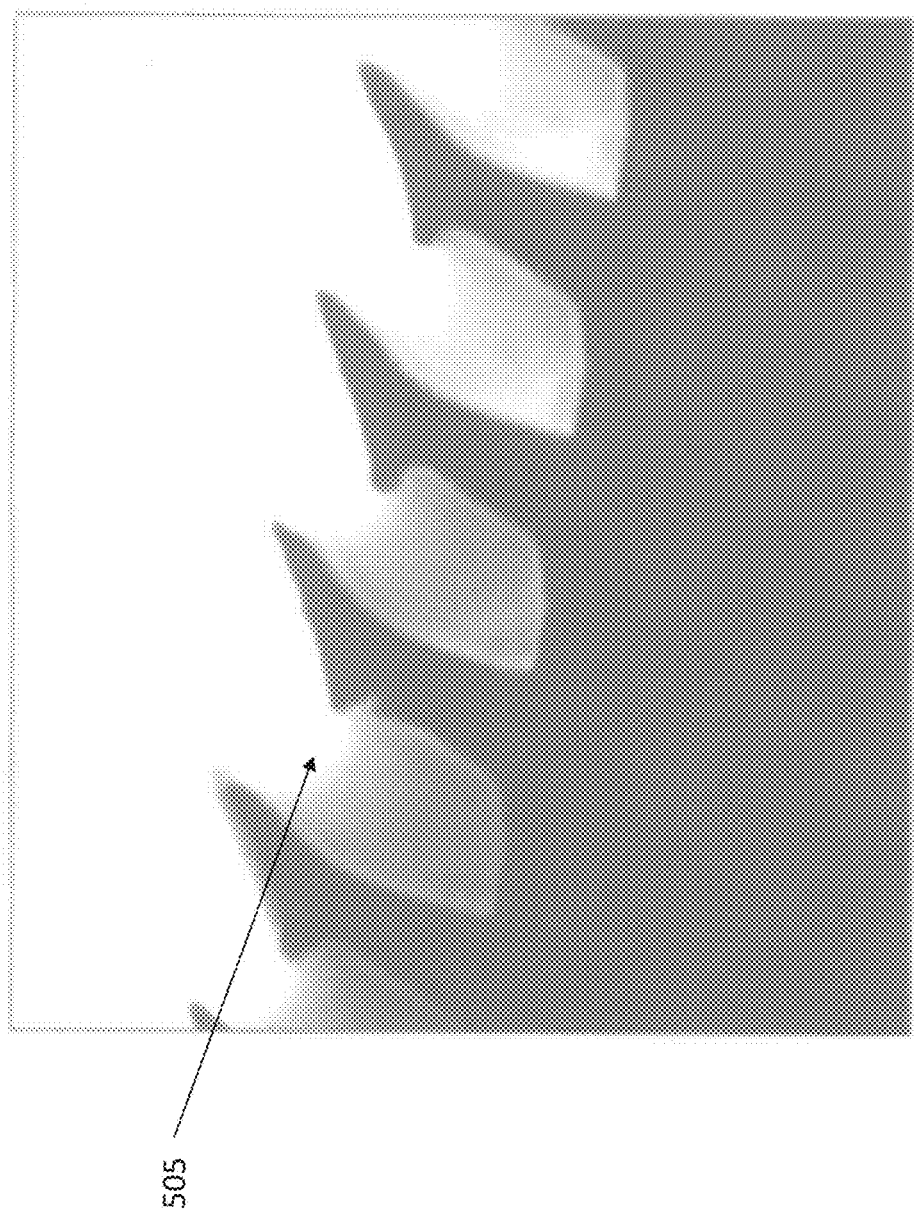
FIG. 5 illustrates exemplary fiber geometry.

FIG. 5 illustrates an exemplary fiber geometry (505).

Figure 6:
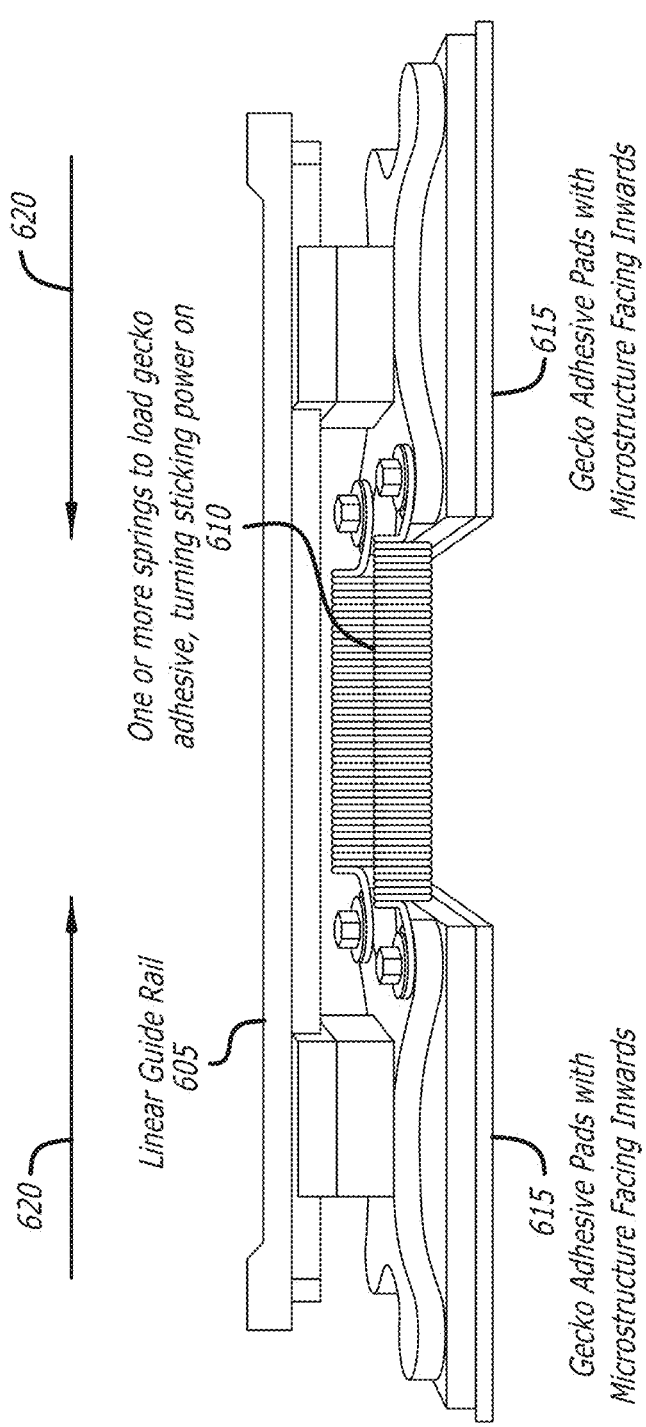
FIG. 6 illustrates an adhesive structure in the ON state.

FIG. 6 illustrates an adhesive structure in the ON state. In FIG. 6, the preferred direction of the pads (615) is facing inward, toward the center of the structure, in the same direction of arrows (620); that is, the fibers of the pads are bending in the outward direction, away from the center of the structure, opposite arrows (620). The springs (610) are pulling the pads in the inward direction, the same direction as arrows (620). The structure of FIG. 6 is therefore in the ON or adhesive state. FIG. 6 also shows a linear guide rail (605). The pads (615) can be gecko adhesive pads with microstructure facing inwards. The springs (610) can be one or more springs to load the gecko adhesive, turning sticking power ON.

Figure 7A:
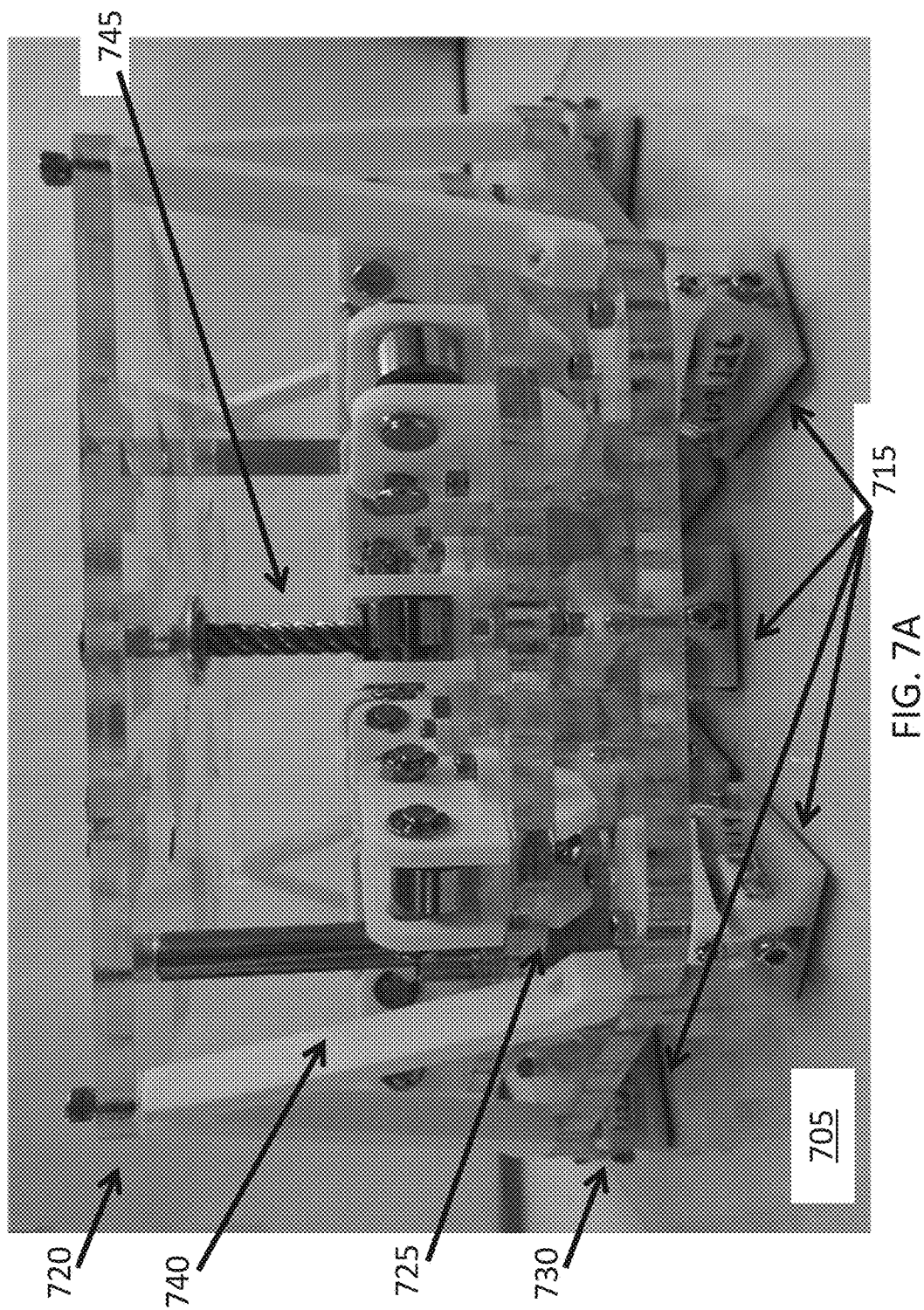
FIGS. 7A and 7B illustrate another embodiment of an adhesive structure, in both OFF (FIG. 7A) and ON (FIG. 7B) states.
Figure 7B:
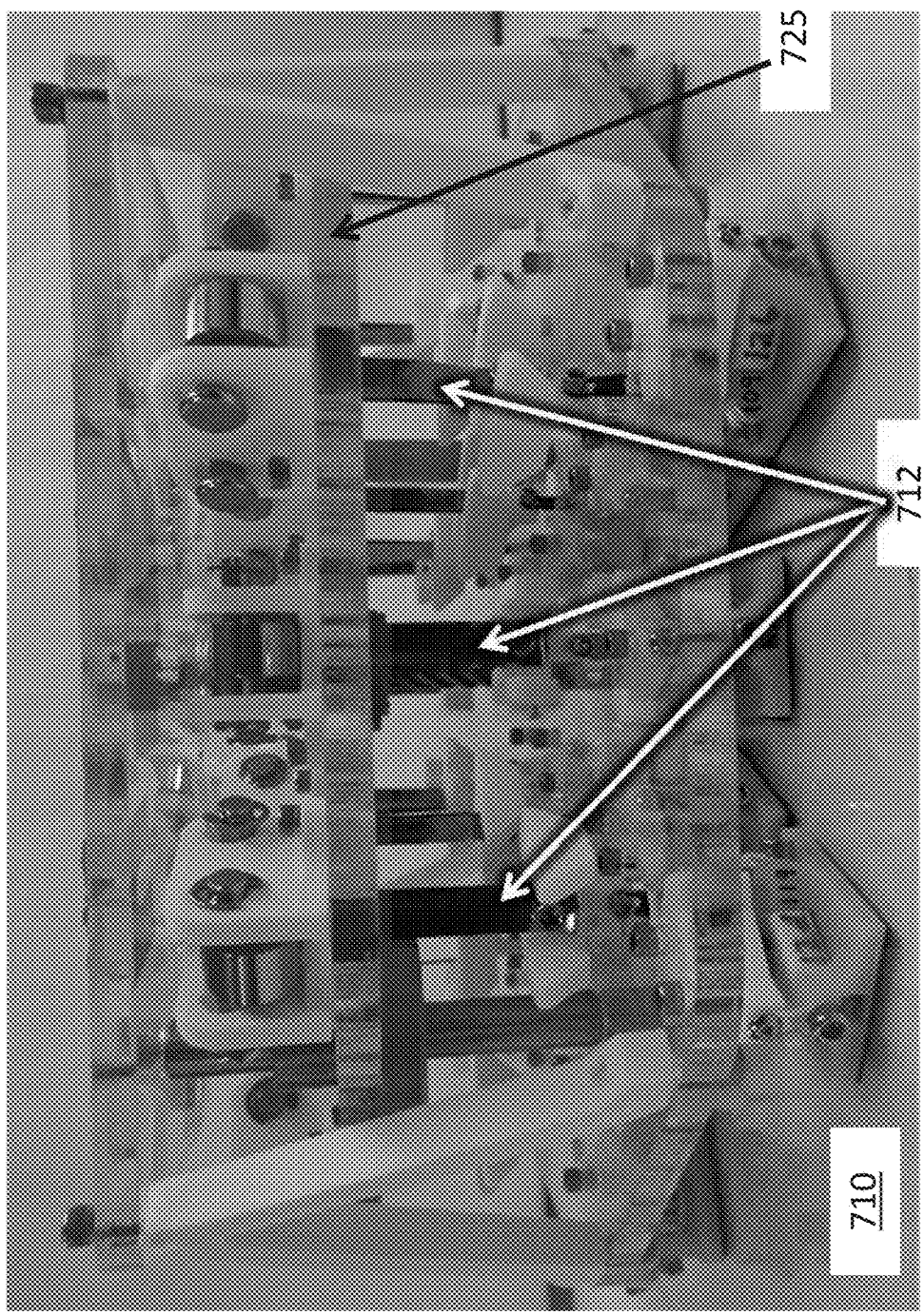

FIGS. 7A and 7B illustrate another embodiment of an adhesive structure, in both OFF (705) and ON (710) states.

The adhesive structures of the present disclosure comprise connecting elements that form a mechanical supporting structure linking the pads. For example, as visible in FIG. 7A, the connecting elements may comprise a top plate (720), a bottom plate (730), and further structural elements (740). The adhesive structures of the present disclosure comprise also actuating elements that form an actuating link between the pads. For example, as visible in FIG. 7B, the actuating elements may comprise a middle plate (725) and constant force springs (712) which act on the pads (715).

In the embodiment of FIG. 7A, in the OFF state (705), the middle plate (725) is lowered and the springs (712) are relaxed. As shown in FIG. 7B, the ON state (710), the middle plate (725) is pulled away from pads (715) (e.g. pairs of gecko adhesive pads), thereby extending springs (712), applying a force to the pads (715). The pads (715) are pulled toward each other, in pairs, as described above in the present disclosure. The constant force springs (712) allow an even distribution of forced among the pads (712). The middle plate (725) can be moved up and down between top and lower plate by, for example, a screw mechanism (745).

FIGS. 8A and 8B illustrate another embodiment of an adhesive structure, in both OFF (805) and ON (810) states.

In the embodiment of FIGS. 8A and 8B, a trigger mechanism (820) can trigger a fast adhesion of the structure to a surface. The trigger (820) can be activated when it is pushed against a surface, making solid contact. The trigger (820) will actuate the springs (825), applying a force to the pads (830). As shown in FIG. 8A, the pads (830) are connected by a wire or cable (835) to the center of each gecko adhesive pad. A pin (840, 845) can be used to engage the trigger (820) in a ready state. With the pin down (840), the trigger (820) is ready to be activated. With the pin up (845), the trigger (820) has been activated. In the ON state (810), a surface (850) is sticking to the structure. In the OFF state (805), the springs are extended, but held in place by the trigger mechanism. In the ON state (810), the trigger is freed, the spring applies squeeze force to gecko pads (830) so stickiness is turned on.

Figure 9:
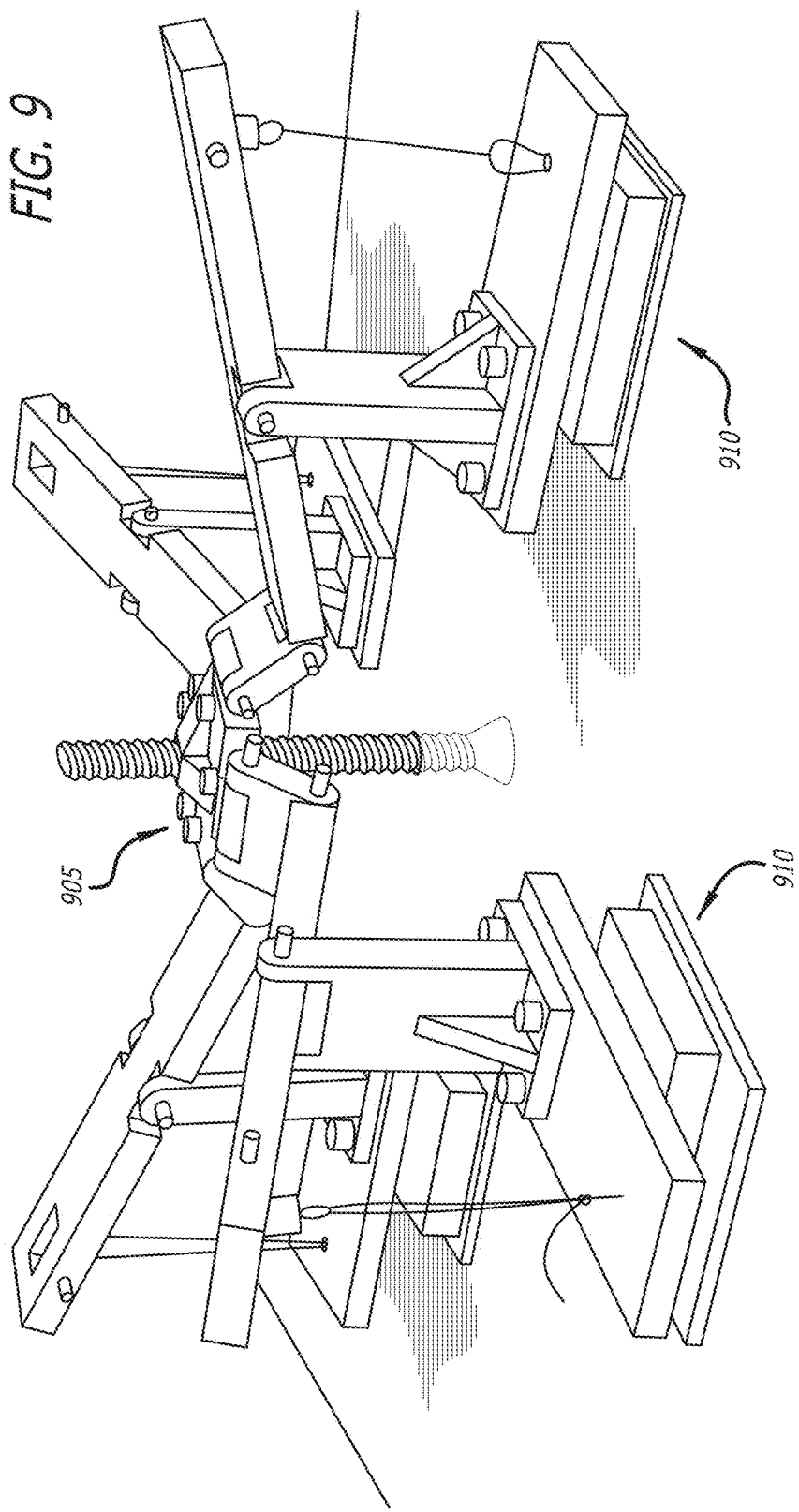
FIG. 9 illustrates an embodiment of an adhesive structure with a ratchet mechanism.

FIG. 9 illustrates one embodiment of a gripper with a ratchet mechanism (905). The ratchet mechanism may be used to activate the pads (910) by applying opposing forces to the pads.

FIG. 10 illustrates two exemplary pads (1001, 1002) for grippers which have a counter-rotating mechanism. For example, a pad (1001) may have a ring rotating clockwise (1005) and a disk rotating counterclockwise (1010). Another pad (1002) may have a ring rotating clockwise (1015) and another ring rotating counterclockwise (1020). The counter-rotating pads function in a similar manner as to that described above for other embodiments, with the difference that each pad has opposing directions (the counter-rotating rings) to enhance their gripping strength.

In some embodiments, at least two pads can form a group which operates based on the principle of opposing forces as described above in the present disclosure. The groups may comprise two, or three pads or more. The actuating elements of each group may operate independently of the other groups, or the actuating elements may operate in a dependent way, for example in unison. For example, all actuating elements may be operated by a single trigger or activating mechanism.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A structure comprising:
at least two pads, each having a first surface and a second surface, wherein the at least two pads are spaced apart substantially a same distance from a center of symmetry of the structure;
a plurality of fibers attached to the first surface of each pad, wherein the plurality of fibers substantially extend longitudinally in a direction away from the first surface;
connecting elements, attached to the second surface of each pad, the connecting elements forming a mechanical supporting structure linking together the at least two pads;
actuating elements, attached to the second surface of each pad, the actuating elements forming an actuating link between the at least two pads, wherein, during operation, the at least two pads are pulled in a tensing direction by the actuating elements, the tensing direction being towards or away from the center of symmetry, wherein a bending direction of the plurality of fibers of each pad is substantially opposite to the tensing direction, and wherein the plurality of fibers is configured to bend and compress against a surface external to the structure to enable adhesion through van der Waals forces; and
a mechanical trigger element connected to the actuating elements, wherein the mechanical trigger element, when the at least two pads are pressed against the surface external to the structure, activates the actuating elements.

2. The structure of claim 1, wherein the at least two pads form one group of a plurality of groups, each group comprising at least two pads.

3. The structure of claim 2, wherein the actuating elements of each group of the plurality of groups operate independently from any other actuating element of another group of the plurality of groups.

4. The structure of claim 1, wherein the first surface of at least one pad of the at least two pads is substantially circular and the at least one pad comprises a counter-rotating mechanism comprising at least two concentric rings, wherein:
at least one ring that is able to rotate clockwise; and
at least one ring that is able to rotate counterclockwise, and wherein the bending direction of the plurality of fibers of each ring is substantially opposite to a rotating direction of said each ring.

5. The structure of claim 2, wherein the actuating elements of each group are activated by a single trigger or activating mechanism.

6. The structure of claim 1, wherein the plurality of fibers are made of polymers.

7. The structure of claim 1, wherein the actuating elements are selected from the group consisting of: springs, wires, cables, linear rails, ball-screws, linear actuators, spherical pivots, and ratchets.

8. The structure of claim 1, wherein the actuating elements are configured to set the structure in an adhesive state and a non adhesive state.

* * * * *